Sept. 24, 1935.  A. KÖNIG  2,015,527
EYE-PIECE HAVING OPTICAL MEMBERS THAT CONSIST
OF A LENS SYSTEM AND A PRISM SYSTEM
Filed May 10, 1935
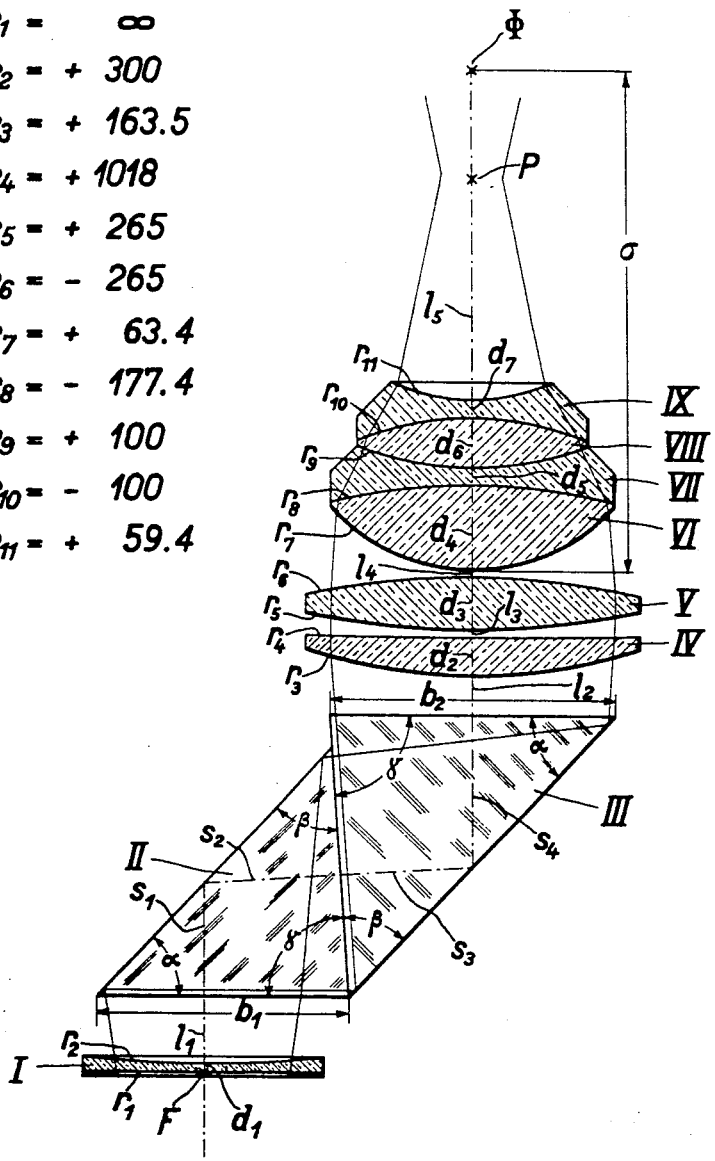
| $r_1$ = | ∞ |
| $r_2$ = | + 300 |
| $r_3$ = | + 163.5 |
| $r_4$ = | + 1018 |
| $r_5$ = | + 265 |
| $r_6$ = | − 265 |
| $r_7$ = | + 63.4 |
| $r_8$ = | − 177.4 |
| $r_9$ = | + 100 |
| $r_{10}$ = | − 100 |
| $r_{11}$ = | + 59.4 |
| $d_1$ = | 1.7 |
| $l_1$ = | 21.25 |
| $s_1$ = | 36.7 |
| $s_2$ = | 44.2 |
| $s_3$ = | 42.5 |
| $s_4$ = | 48.3 |
| $l_2$ = | 13.75 |
| $d_2$ = | 13.3 |
| $l_3$ = | 0.7 |
| $d_3$ = | 18.3 |
| $l_4$ = | 0.7 |
| $d_4$ = | 28.3 |
| $d_5$ = | 4.3 |
| $d_6$ = | 16.7 |
| $d_7$ = | 4.3 |
| $l_5$ = | 72 |
| $b_1$ = | 72.7 |
| $b_2$ = | 90.0 |
| $\alpha$ = | 47° |
| $\beta$ = | 46° |
| $\gamma$ = | 87° |
|       | I | II | III | IV | V | VI |
|-------|-------|-------|-------|-------|-------|-------|
| $n_D$ = | 1.547 | 1.665 | 1.665 | 1.623 | 1.623 | 1.568 |
| $\nu$ = | 53.6 | 35.7 | 35.7 | 56.9 | 56.9 | 63.0 |
|       | VII | VIII | IX |
|-------|-------|-------|-------|
| $n_D$ = | 1.648 | 1.465 | 1.603 |
| $\nu$ = | 33.9 | 65.7 | 42.5 |
Inventor:
Albert König Patented Sept. 24, 1935

2,015,527

UNITED STATES PATENT OFFICE 2,015,527

EYE-PIECE HAVING OPTICAL MEMBERS THAT CONSIST OF A LENS SYSTEM AND A PRISM SYSTEM

Albert König, Jena, Germany, assignor to the firm of Carl Zeiss, Jena, Germany

Application May 10, 1935, Serial No. 20,707
In Germany May 14, 1934

3 Claims. (Cl. 88—57)

I have filed an application in Germany, May 14, 1934.

In constructing binocular telescopes and other binocular optical instruments which can be adjusted according to the different interocular distances of observers, use has been made of eye-pieces whose optical members consist of a lens system and a prism system and which are rotatable about the axes of the entering pencils of imaging rays, the prism systems being so designed and positioned as to effect displacements in parallel of the pencils of imaging rays. Placing a prism system of this kind into an eye-piece necessarily entails such a construction of the lens system that it is difficult to obtain at one and the same time a comparatively large field of view and, compared to the focal length of the eye-piece, a comparatively great distance apart of the exit pupil and the eye-lens, as well as a sufficient correction of the image in the entire field of view.

The invention overcomes these disadvantages by providing that the lens system of the eye-piece consists of three groups of lenses separated by spaces of air, that the prism system is disposed in the space of air between the front group of lenses and the median group of lenses of the lens system, that the front group of lenses consists of a member which has a negative focal length whose absolute length is at least equal to the focal length of the entire lens system and at most equal to twenty times this length, that the rear group of lenses consists of a plurality of lenses and has a focal length whose reciprocal magnitude is greater than seven tenths of the negative and smaller than three tenths of the positive reciprocal magnitude of the focal length of the entire system of lenses, that the median group of lenses has a positive focal length whose absolute length is at least half the focal length of the entire lens system and at most equal to three times this length, and that, finally, the absolute magnitude of the front intersectional distance of the rear lens group is at least equal to eleven tenths of the absolute magnitude of the focal length of this lens group, this lens group having at least two pairs of neighbouring surfaces which are eventually cemented together and whose focal lengths are negative. It is advisable to provide that the algebraical difference of curvature of the lens surfaces bounding the space of air between the median and the rear lens group is greater than the reciprocal magnitude of the focal length of the entire lens system and that the entire focal length of the median and the rear lens group is smaller than the corresponding front intersectional distance. In this description there is to be understood by front side the side which does not face the observer and by the rear side the side which faces the observer. Intersectional distance is the distance apart of the focus and the extreme lens surface. The use of the new eye-pieces is not restricted to binocular instruments, since it is advantageous in some cases to have an eye-piece of the said kind in monocular optical instruments.

On account of the use of a diverging lens, the cross-sectional area of the entire pencil of imaging rays enlarges between the image plane and the other lenses, namely in the space at disposal for the prism system, for which reason it is advisable to give the prism system, which usually has parallel bounding surfaces for the entrance and the exit of the rays, two parallel reflecting surfaces and to make this prism system consist of two triangular prisms in such a manner that, at least in a plane parallel to the optical axis, the diameters of those cross-sectional areas of the prisms which are traversed by the rays increase from the ray entrance surface towards the ray exit surface. The triangular prisms can be so constructed that those of their cross-sectional areas which are traversed by the rays are adapted to suit the limitation of the pencil of imaging rays, which means that the space for the prism system is reduced as much as possible and that the space for the lens system is comparatively great.

The following table contains the dimensions relating to a constructional example of an eye-piece according to the invention, this example being represented in the accompanying drawing. The said dimensions refer to a focal length of the entire system of lenses of $+100$ units of measurement. The eye-piece consists of a front lens I, a prism system of two cemented triangular prisms II and III, a median lens group of two single lenses IV and V and a rear meniscal member of four lenses VI, VII, VIII and IX cemented together. F is the axial point of the front focal plane of the entire lens system and lies in the front surface of the lens I, P is the axial point of the exit pupil of the entire eye-piece, and $\phi$ is the front focus of the rear lens group consisting of the lenses VI, VII, VIII and IX, this focus having an intersectional distance $\sigma$. $r$ designates the radii of the lenses, $d$ the thicknesses of the lenses, $l$ the distances, $b_1$ the breadth of the ray entrance surface, and $b_2$ the breadth of the ray exit surface of the prism system consisting of the prisms II and III. $s_1, s_2, s_3$ and $s_4$ designate the paths of the axial ray in the prism system, and $\alpha, \beta$ and $\gamma$ designate the angles in the triangular prisms II and III. The used kinds of glass are determined by the refractive indices $n_D$ for the D-line of the solar spectrum and by the Abbe figures $\nu$. The focal length of the lens I is $-548$, the focal length of the median lens group consisting of the lenses IV and V is $+131$, and the focal length of the rear lens group consisting of the lenses VI, VII, VIII and IX is $-788$. The limitation of the pencil of imaging rays is indicated by thin lines in the drawing. The distance $\sigma$ of the point $\phi$ from the corresponding lens apex is $-1143$. This distance is reduced in the drawing.

|  | I | II | III | IV | V | VI | VII | VIII | IX |
|---|---|---|---|---|---|---|---|---|---|
| $n_D$ | 1.547 | 1.665 | 1.665 | 1.623 | 1.623 | 1.568 | 1.648 | 1.465 | 1.603 |
| $\nu$ | 53.6 | 35.7 | 35.7 | 56.9 | 56.9 | 63.0 | 33.9 | 65.7 | 42.5 |

$r_1 = \infty$
$r_2 = +300$
$r_3 = +163.5$
$r_4 = +1018$
$r_5 = +265$
$r_6 = -265$
$r_7 = +63.4$
$r_8 = -177.4$
$r_9 = +100$
$r_{10} = -100$
$r_{11} = +59.4$ $b_1 = 72.7$
$b_2 = 90.0$ $\alpha = 47°$
$\beta = 46°$
$\gamma = 87°$ $d_1 = 1.7$
$l_1 = 21.25$
$s_1 = 36.7$
$s_2 = 44.2$
$s_3 = 42.5$
$s_4 = 48.3$
$l_2 = 13.75$
$d_2 = 13.3$
$l_3 = 0.7$
$d_3 = 18.3$
$l_4 = 0.7$
$d_4 = 28.3$
$d_5 = 4.3$
$d_6 = 16.7$
$d_7 = 4.3$ $l_5 = 72$

I claim:

1. An eye-piece, especially for use in binocular telescopes, the optical members of this eye-piece consisting of a lens system and a prism system, the said lens system consisting of a front, a median and a rear part, the said parts being separated from each other by spaces of air, the said prism system being disposed in the space of air between the front and the median of the said parts and having two reflecting surfaces, the said front part consisting at least of a diverging lens and having an absolute focal length which is at least equal to the focal length of the entire lens system and at most equal to twenty times this focal length, the said median part consisting at least of a converging lens and having a positive focal length, the absolute focal length of this median part being at least equal to half the focal length of the entire lens system and at most equal to three times this focal length, the said rear part consisting of a plurality of lenses, the reciprocal focal length of this part being greater than seven tenths of the negative reciprocal focal length of the entire lens system and smaller than three tenths of the positive reciprocal length of this lens system, the focal lengths of at least two pairs of neighbouring lens surfaces of the said rear part being negative, and the absolute front intersectional distance of this part being at least equal to eleven tenths of the absolute focal length of this part.

2. In an eye-piece according to claim 1, the algebraical difference of curvature of those lens surfaces which bound the air space between the median and the rear of the said parts of the lens system being greater than the reciprocal focal length of the entire lens system, and the entire focal length of this median and this rear part being smaller than the corresponding front intersectional distance of these parts.

3. In an eye-piece according to claim 1, the lens surfaces of at least one of the said pairs of neighbouring lens surfaces of the said rear part of the lens system being cemented to each other.

ALBERT KÖNIG.